United States Patent
Yoshioka et al.

(10) Patent No.: US 12,442,857 B2
(45) Date of Patent: Oct. 14, 2025

(54) ERROR RATE MEASUREMENT APPARATUS AND ERROR RATE MEASUREMENT METHOD

(71) Applicant: ANRITSU CORPORATION, Kanagawa (JP)

(72) Inventors: Hironori Yoshioka, Kanagawa (JP); Tatsuya Iwai, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 18/631,416

(22) Filed: Apr. 10, 2024

(65) Prior Publication Data

US 2025/0020718 A1    Jan. 16, 2025

(30) Foreign Application Priority Data

Jul. 11, 2023 (JP) .................. 2023-113793

(51) Int. Cl.
*G01R 31/317* (2006.01)
*G01R 31/3185* (2006.01)

(52) U.S. Cl.
CPC . *G01R 31/3171* (2013.01); *G01R 31/318572* (2013.01)

(58) Field of Classification Search
CPC ........ G01R 31/3171; G01R 31/318572; G01R 31/31703; G01R 31/2841; H04L 1/203; H04L 43/0847; H04L 43/50
See application file for complete search history.

(56) References Cited

U.S. PATENT DOCUMENTS 7,895,480 B2 * 2/2011 Maucksch ............... H04L 1/203
714/704
9,264,187 B1    2/2016 Sosa et al.
(Continued)

FOREIGN PATENT DOCUMENTS

| JP | 2007-155457 A | 6/2007 |
| JP | 2017-538367 A | 12/2017 |
| JP | 6818056 B2 | 1/2021 |

OTHER PUBLICATIONS

S. M. Berber, "An automated method for BER characteristics measurement," in IEEE Transactions on Instrumentation and Measurement, vol. 53, No. 2, pp. 575-580, Apr. 2004 (Year: 2004).*

*Primary Examiner* — Cynthia Britt
(74) *Attorney, Agent, or Firm* — McDonald Hopkins LLC

(57) ABSTRACT

An error rate measurement apparatus includes a provisional confidence level calculation unit that calculates a provisional confidence level CLx by using the sum x, an upper and lower limit value update unit that substitutes the sum x for the variable min_x in a case where the provisional confidence level CLx is equal to or lower than a target confidence level $CL_s$, and substitutes the sum x for the variable max_x in a case where the provisional confidence level CLx is higher than the target confidence level $CL_s$, and a measurement time calculation unit that calculates, in a case where changes in a value of the sum x calculated by the average value calculation unit are converged in a predetermined range, a value obtained by dividing the converged sum x by a product of a data rate and a target error rate $ER_s$, as the measurement time.

8 Claims, 9 Drawing Sheets

(56) References Cited

U.S. PATENT DOCUMENTS

| | | | |
|---|---|---|---|
| 12,265,120 B2* | 4/2025 | Onuma | G01R 31/3171 |
| 2021/0050918 A1* | 2/2021 | Rekaya | H04B 10/2525 |
| 2024/0044974 A1* | 2/2024 | Onuma | G01R 31/3171 |
| 2024/0322953 A1* | 9/2024 | Kidokoro | H04L 1/203 |
| 2025/0020717 A1* | 1/2025 | Iwai | G01R 31/3171 |

* cited by examiner

| times | x | min_x | max_x | CL_s | CL_x |
|---|---|---|---|---|---|
| 1 | 8.98846567431158E+307 | 0.00000000000000E+00 | 1.79769313486232E+308 | 0.98 | 1.00000000000000E+00 |
| 2 | 4.49423283715579E+307 | 0.00000000000000E+00 | 8.98846567431158E+307 | 0.98 | 1.00000000000000E+00 |
| 3 | 2.24711641857789E+307 | 0.00000000000000E+00 | 4.49423283715579E+307 | 0.98 | 1.00000000000000E+00 |
| 4 | 1.12355820928895E+307 | 0.00000000000000E+00 | 2.24711641857789E+307 | 0.98 | 1.00000000000000E+00 |
| 5 | 5.61779104644474E+306 | 0.00000000000000E+00 | 1.12355820928895E+307 | 0.98 | 1.00000000000000E+00 |
| 6 | 2.80889552322237E+306 | 0.00000000000000E+00 | 5.61779104644474E+306 | 0.98 | 1.00000000000000E+00 |
| 7 | 1.40444776161118E+306 | 0.00000000000000E+00 | 2.80889552322237E+306 | 0.98 | 1.00000000000000E+00 |
| 8 | 7.02223880805592E+305 | 0.00000000000000E+00 | 1.40444776161118E+306 | 0.98 | 1.00000000000000E+00 |
| 9 | 3.51111940402796E+305 | 0.00000000000000E+00 | 7.02223880805592E+305 | 0.98 | 1.00000000000000E+00 |
| 10 | 1.75555970201398E+305 | 0.00000000000000E+00 | 3.51111940402796E+305 | 0.98 | 1.00000000000000E+00 |
| 1051 | 9.08411537855863E+00 | 9.08411537110805E+00 | 9.08411538600921E+00 | 0.98 | 9.79999999945363E-01 |
| 1052 | 9.08411538228392E+00 | 9.08411537855863E+00 | 9.08411538600921E+00 | 0.98 | 9.79999999998168E-01 |
| 1053 | 9.08411538414657E+00 | 9.08411538228392E+00 | 9.08411538600921E+00 | 0.98 | 9.80000000024570E-01 |
| 1054 | 9.08411538321525E+00 | 9.08411538228392E+00 | 9.08411538414657E+00 | 0.98 | 9.80000000011369E-01 |
| 1055 | 9.08411538274959E+00 | 9.08411538228392E+00 | 9.08411538321525E+00 | 0.98 | 9.80000000004769E-01 |
| 1056 | 9.08411538251675E+00 | 9.08411538228392E+00 | 9.08411538274959E+00 | 0.98 | 9.80000000001468E-01 |
| 1057 | 9.08411538240034E+00 | 9.08411538228392E+00 | 9.08411538251675E+00 | 0.98 | 9.79999999999818E-01 |
| 1058 | 9.08411538245855E+00 | 9.08411538240034E+00 | 9.08411538251675E+00 | 0.98 | 9.80000000000643E-01 |
| 1059 | 9.08411538242944E+00 | 9.08411538240034E+00 | 9.08411538245855E+00 | 0.98 | 9.80000000000231E-01 |
| 1060 | 9.08411538241489E+00 | 9.08411538240034E+00 | 9.08411538242944E+00 | 0.98 | 9.80000000000024E-01 |
| 1061 | 9.08411538240762E+00 | 9.08411538240034E+00 | 9.08411538241489E+00 | 0.98 | 9.79999999999921E-01 |
| 1062 | 9.08411538241125E+00 | 9.08411538240762E+00 | 9.08411538241489E+00 | 0.98 | 9.79999999999973E-01 |
| 1063 | 9.08411538241307E+00 | 9.08411538241125E+00 | 9.08411538241489E+00 | 0.98 | 9.79999999999998E-01 |
| 1064 | 9.08411538241398E+00 | 9.08411538241307E+00 | 9.08411538241489E+00 | 0.98 | 9.80000000000011E-01 |
| 1065 | 9.08411538241353E+00 | 9.08411538241307E+00 | 9.08411538241398E+00 | 0.98 | 9.80000000000005E-01 |
| 1066 | 9.08411538241330E+00 | 9.08411538241307E+00 | 9.08411538241353E+00 | 0.98 | 9.80000000000002E-01 |
| 1067 | 9.08411538241319E+00 | 9.08411538241307E+00 | 9.08411538241330E+00 | 0.98 | 9.80000000000000E-01 |
| 1068 | 9.08411538241313E+00 | 9.08411538241307E+00 | 9.08411538241319E+00 | 0.98 | 9.79999999999999E-01 |
| 1069 | 9.08411538241316E+00 | 9.08411538241313E+00 | 9.08411538241319E+00 | 0.98 | 9.79999999999999E-01 |
| 1070 | 9.08411538241317E+00 | 9.08411538241316E+00 | 9.08411538241319E+00 | 0.98 | 9.80000000000000E-01 |
| 1071 | 9.08411538241318E+00 | 9.08411538241317E+00 | 9.08411538241319E+00 | 0.98 | 9.80000000000000E-01 |
| 1072 | 9.08411538241318E+00 | 9.08411538241318E+00 | 9.08411538241319E+00 | 0.98 | 9.80000000000000E-01 |

FIG. 4

| Unit of measurement | Bit | PAM4 Symbol | Flit | Codeword |
|---|---|---|---|---|
| Data rate | Baud rate × 1 or × 2 | Baud rate × 1 | Baud rate × 2/flit length | Baud rate × 2/CW length |

FIG. 7

ERROR RATE MEASUREMENT APPARATUS AND ERROR RATE MEASUREMENT METHOD

TECHNICAL FIELD

The present invention relates to an error rate measurement apparatus and an error rate measurement method of measuring an error rate of a signal input from a device under test.

BACKGROUND ART

In the related art, an error rate measurement apparatus (bit error rate tester (BERT)) has been used to measure an error rate (see, for example, Patent Documents 1 to 3). The measurement of the error rate is very important analysis means in a case of evaluating the performance of various communication devices as a device under test.

Most of the errors that occur in an actual system are due to random noise, and the errors occur at random times. In addition, in a system using a decision feedback equalizer (DFE), a random error may be a burst error.

Therefore, the evaluation of the confidence of the bit error rate (BER) is usually performed under a condition of E≥1 by using a confidence level defined by the following expression (1). Here, the confidence level CL of the expression (1) indicates a probability that a true BER of the system is lower than a BER to be targeted (target BER).

$$CL = e^{-N \times BER_S} \times \sum_{k=0}^{E} \frac{(N \times BER_S)^k}{k!} \quad (1)$$

In the expression (1),

N: bit rate [bit/s]×measurement time [s] (the number of bits to be measured), $BER_s$: target BER, and E: assumed number of errors.

The measurement time required to realize a desired confidence level CL for a predefined target BER varies depending on the desired confidence level CL or the bit rate. For example, in a case where E=0 in error-free measurement, it is easy to solve the expression (1) for N in a case where $BER_s$ and CL are given, but it is mathematically very difficult and not practical to solve the expression (1) for N in a case where E≥1.

RELATED ART DOCUMENT

Patent Document

[Patent Document 1] Japanese Patent No. 6818056
[Patent Document 2] JP-A-2007-155457
[Patent Document 3] JP-T-2017-538367

DISCLOSURE OF THE INVENTION

Problem that the Invention is to Solve

That is, in the error rate measurement apparatus in the related art disclosed in Patent Documents 1 to 3, it is not possible to automatically evaluate how long the measurement time needs to be set in order to realize a required confidence level in a case where the assumed number of errors E is 1 or more.

In practice, the step of the measurement time set by a user is a 1-second step or a 0.1-second step, and there is no need to obtain the measurement time mathematically strictly. For example, in a case where the bit rate=32 Gbit/s, the $BER_s$=1E−10, and E=2, the confidence level CL with respect to the measurement time is as illustrated in a graph of FIG. 9. For example, the measurement time in a case where CL=95% is approximately 1.967 seconds, but it is sufficient to have an accuracy of 2 seconds (CL=95.36%) in practice.

However, in the related art, there is a problem that the user himself/herself has to search for the measurement time in which the desired confidence level CL can be obtained by slightly changing the measurement time to be substituted into the expression (1) or has to set the measurement time to be long, which results in a decrease in work efficiency.

In addition, currently, the error measurement by the error rate measurement apparatus also extends to various types, and in addition to the BER of a non-return-to-zero (NRZ) signal (hereinafter, also simply referred to as an "NRZ signal") in the related art, a symbol error rate (SER) is also added as an evaluation indicator for a pulse amplitude modulation 4 (PAM4) signal (hereinafter, also simply referred to as a "PAM4 signal") and the like. Further, in standards based on forward error correction (FEC) such as 400 Gigabit Ethernet (GbE) and Peripheral Component Interconnect Express (PCIe) (registered trademark) Generation (Gen) 6, it is also important to evaluate an "Uncorrectable Codeword Rate" or a "Flit Error Rate" which is an indicator of whether or not error correction by the FEC can be performed, in addition to the evaluation of the BER, the SER, or the like. The Flit is a flow control unit.

The present invention has been made in order to solve such a problem in the related art, and an object of the present invention is to provide an error rate measurement apparatus and an error rate measurement method capable of calculating a measurement time in which a desired confidence level can be obtained in measurement of an error rate of an input signal.

Means for Solving the Problem

In order to achieve the above object, an aspect of the present invention relates to an error rate measurement apparatus (1) that measures an error rate of an input signal from a device under test (200), the error rate measurement apparatus including: a processing unit (30) that calculates a measurement time satisfying a target confidence level based on the target confidence level, a data rate of the input signal, a target error rate of the input signal, and an assumed number of errors E during the measurement time of the input signal, in which the processing unit includes an average value calculation unit (31) that calculates a sum x of a value obtained by dividing a variable min_x by 2 and a value obtained by dividing a variable max_x by 2, a provisional confidence level calculation unit (32) that substitutes the sum x into the following expression (2) to calculate a provisional confidence level CLx, an upper and lower limit value update unit (33) that substitutes the sum x for the variable min_x in a case where the provisional confidence level CLx is equal to or lower than the target confidence level, and substitutes the sum x for the variable max_x in a case where the provisional confidence level CLx is higher than the target confidence level, a convergence determination unit (36) that determines whether or not changes in a value of the sum x calculated by the average value calculation unit are converged in a predetermined range, and a measurement time calculation unit (38) that calculates, in a case where the convergence determination unit determines the convergence, a value obtained by dividing the converged sum x by a product of the data rate and the target error rate, as the measurement time, and the processing unit repeats processing of the average value calculation unit, the provisional confidence level calculation unit, and the upper and lower limit value update unit by using a latest variable min_x and a latest variable max_x in a case where the convergence determination unit does not determine the convergence $$CLx = e^{-x} \times \sum_{k=0}^{E} \frac{x^k}{k!}. \quad (2)$$

With this configuration, in the error rate measurement of the input signal, the error rate measurement apparatus according to the aspect of the present invention can calculate the measurement time in which the desired target confidence level can be obtained by performing narrowing-down processing of the sum x without making a user aware that calculation processing of the measurement time is performed.

In the error rate measurement apparatus according to the aspect of the present invention, the sum x calculated by the average value calculation unit may include a rounding error, and the measurement time calculation unit may calculate, in a case where significant figures of the sum x are converged to a certain value, a value obtained by dividing the converged sum x by the product of the data rate and the target error rate, as the measurement time.

With this configuration, in the error rate measurement apparatus according to the aspect of the present invention, since the convergence due to the rounding error is used as an end determination condition of the narrowing-down processing of the sum x, the user can save the time and effort of considering a range of available values as the sum x or the number of repetitions of the processing each time various measurement conditions are changed on a setting screen.

In the error rate measurement apparatus according to the aspect of the present invention, the sum x may be data of a double-precision floating-point number, and the significant figure may be a mantissa of the double-precision floating-point number.

With this configuration, in a case where the numerical types of the variable min_x, the variable max_x, and the sum x are the double-precision floating-point number, the error rate measurement apparatus according to the aspect of the present invention can calculate the measurement time by using the sum x having the significant figures of approximately 14 digits in decimal conversion.

The error rate measurement apparatus according to the aspect of the present invention may further include an error rate calculation unit (25) that calculates the error rate of the input signal over the measurement time calculated by the measurement time calculation unit.

With this configuration, the error rate measurement apparatus according to the aspect of the present invention can calculate the error rate of the input signal over the measurement time in which the desired target confidence level can be obtained.

Another aspect of the present invention relates to an error rate measurement method of measuring an error rate of an input signal from a device under test (200), the error rate measurement method including: an input step (S22) of inputting a target confidence level, a data rate of the input signal, a target error rate of the input signal, and an assumed number of errors E during a measurement time of the input signal; a step (S24) of setting initial values of a variable min_x and a variable max_x; an average value calculation step (S25) of calculating a sum x of a value obtained by dividing the variable min_x by 2 and a value obtained by dividing the variable max_x by 2; a provisional confidence level calculation step (S27) of substituting the sum x into the following expression (2) to calculate a provisional confidence level CLx; a lower limit value update step (S29) of substituting the sum x for the variable min_x in a case where the provisional confidence level CLx is equal to or lower than the target confidence level; an upper limit value update step (S30) of substituting the sum x for the variable max_x in a case where the provisional confidence level CLx is higher than the target confidence level; a step (S26) of repeating processing of the average value calculation step, the provisional confidence level calculation step, the lower limit value update step, and the upper limit value update step by using a latest variable min_x and a latest variable max_x; and a measurement time calculation step (S31) of calculating, in a case where changes in a value of the sum x calculated in the average value calculation step are converged in a predetermined range, a value obtained by dividing the converged sum x by a product of the data rate and the target error rate, as the measurement time satisfying the target confidence level $$CLx = e^{-x} \times \sum_{k=0}^{E} \frac{x^k}{k!}. \quad (2)$$

In the error rate measurement method according to the aspect of the present invention, the sum x calculated in the average value calculation step may include a rounding error, and in the measurement time calculation step, in a case where significant figures of the sum x are converged to a certain value, a value obtained by dividing the converged sum x by the product of the data rate and the target error rate may be calculated as the measurement time.

In the error rate measurement method according to the aspect of the present invention, the sum x may be data of a double-precision floating-point number, and the significant figure may be a mantissa of the double-precision floating-point number.

The error rate measurement method according to the aspect of the present invention may further include an error rate calculation step (S34) of calculating the error rate of the input signal over the measurement time calculated in the measurement time calculation step.

Advantage of the Invention

The present invention provides the error rate measurement apparatus and the error rate measurement method capable of calculating the measurement time in which the desired confidence level can be obtained in the measurement of the error rate of the input signal.

BRIEF DESCRIPTION OF THE DRAWINGS

FIG. 4 is a table illustrating a change in each value in a case where a numerical type is a double type.

FIG. 7 is a table illustrating a unit of measurement and a data rate of each unit of measurement.

BEST MODE FOR CARRYING OUT THE INVENTION

Hereinafter, embodiments of an error rate measurement apparatus and an error rate measurement method according to the present invention will be described with reference to the accompanying drawings.

Figure 1:
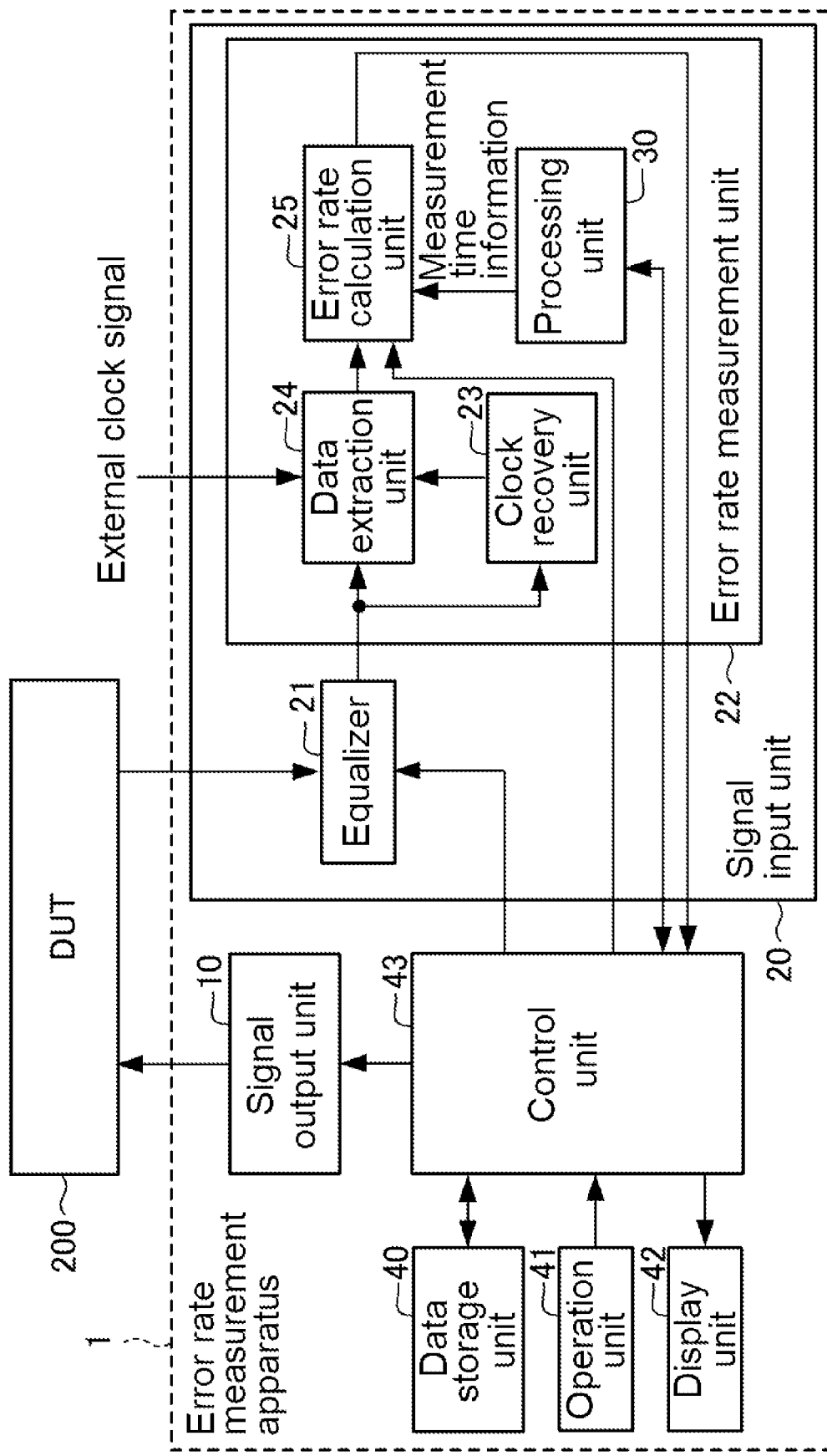
FIG. 1 is a block diagram illustrating a configuration of an error rate measurement apparatus according to an embodiment of the present invention.

As illustrated in FIG. 1, the error rate measurement apparatus 1 according to the embodiment of the present invention measures an error rate of an input signal output from a device under test (DUT) 200, and includes a signal output unit 10, a signal input unit 20, a data storage unit 40, an operation unit 41, a display unit 42, and a control unit 43.

Examples of a standard corresponding to the DUT 200 include PCIe Gen1 to Gen6, universal serial bus (USB) 3.1 to 4, common electrical interface (CEI), IEEE 802.3, InfiniBand HDR, and Fibre Channel.

The data storage unit 40 is configured with a memory, such as a random access memory (RAM). The data storage unit 40 stores, as signal data of a known pattern to be input to the DUT 200 from the signal output unit 10, for example, bit string data of an NRZ signal (data of a bit string consisting of 0 or 1), symbol string data of a PAM4 signal (data of a symbol string consisting of 0, 1, 2, or 3), or the like, which will be described below.

The data storage unit 40 may store the bit string data of the most significant bit (MSB) and the least significant bit (LSB) of the PAM4 signal input to the DUT 200. The symbol string data of the PAM4 signal, the bit string data of the MSB and the LSB, and the bit string data of the NRZ signal stored in the data storage unit 40 also serve as reference data for comparison with the input signal from the DUT 200 by an error rate calculation unit 25, which will be described below.

The signal output unit 10 generates a test signal consisting of data of a known pattern, which is input from the data storage unit 40. The signal output unit 10 is configured to output the generated test signal to the DUT 200. In this case, the DUT 200 folds back the test signal output from the signal output unit 10 to use the folded back test signal as the input signal to the signal input unit 20.

The signal input unit 20 is configured to input the input signal output from the DUT 200, and includes an equalizer 21 and an error rate measurement unit 22.

The input signal from the DUT 200 is, for example, the test signal such as the PAM4 signal output from the signal output unit 10, which is folded back from the DUT 200.

The equalizer 21 is configured to adjust frequency characteristics of the input signal from the DUT 200. The equalizer 21 is configured with, for example, a continuous time linear equalizer (CTLE), a low frequency equalizer (LFE), and a decision feedback equalizer (DFE).

The error rate measurement unit 22 includes a clock recovery unit 23, a data extraction unit 24, the error rate calculation unit 25, and a processing unit 30, and measures the error rate of the input signal from the DUT 200.

The clock recovery unit 23 is configured to generate a recovery clock signal from the input signal from the DUT 200 adjusted by the equalizer 21.

The data extraction unit 24 is configured to extract the bit string data or the symbol string data of the input signal from the DUT 200 adjusted by the equalizer 21.

The data extraction unit 24 is configured to extract the bit string data or the symbol string data of the input signal output from the DUT 200 by punching out the input signal adjusted by the equalizer 21 at a timing of a rising or falling edge of the clock signal. Here, the clock signal used by the data extraction unit 24 may be the recovery clock signal output from the clock recovery unit 23, or may be an external clock signal corresponding to a baud rate of the input signal. The recovery clock signal and the external clock signal described herein are collectively referred to as a "clock signal".

For example, the data extraction unit 24 includes a plurality of 0/1 determiners, and the clock signal can be input to each 0/1 determiner to determine a level of the input signal output from the DUT 200 at a timing of the clock signal. The recovery clock signal output from the clock recovery unit 23 is not limited to the data extraction unit 24, and may be used as an operation clock in each unit constituting the error rate measurement apparatus 1.

The error rate calculation unit 25 is configured to calculate the error rate of the input signal from the DUT 200 extracted by the data extraction unit 24 by comparing the bit string data or the symbol string data extracted by the data extraction unit 24 with the reference data stored in the data storage unit 40 in order. The BER, the SER, the uncorrectable codeword rate, and the flit error rate described herein are collectively referred to as an "error rate".

The error rate calculation unit 25 is configured to count the number of errors in the input signal from the DUT 200 over a measurement time set by a setting screen 50 described below or a measurement time calculated by a measurement time calculation unit 38 described below. Further, the error rate calculation unit 25 is configured to calculate a value obtained by dividing the counted number of errors by the number of measurement data of the input signal over the measurement time, as the error rate of the input signal from the DUT 200.

The processing unit 30 is configured to calculate the measurement time of the input signal, which satisfies a target confidence level $CL_s$, based on measurement conditions, such as the target confidence level $CL_s$, the data rate of the input signal, a target error rate $ER_s$ of the input signal, and an assumed number of errors E during the measurement time of the input signal, which are input to the setting screen 50 described below. The target confidence level $CL_s$ represents a probability that a true error rate of the input signal from DUT 200 is lower than the target error rate $ER_s$.

Figure 2:
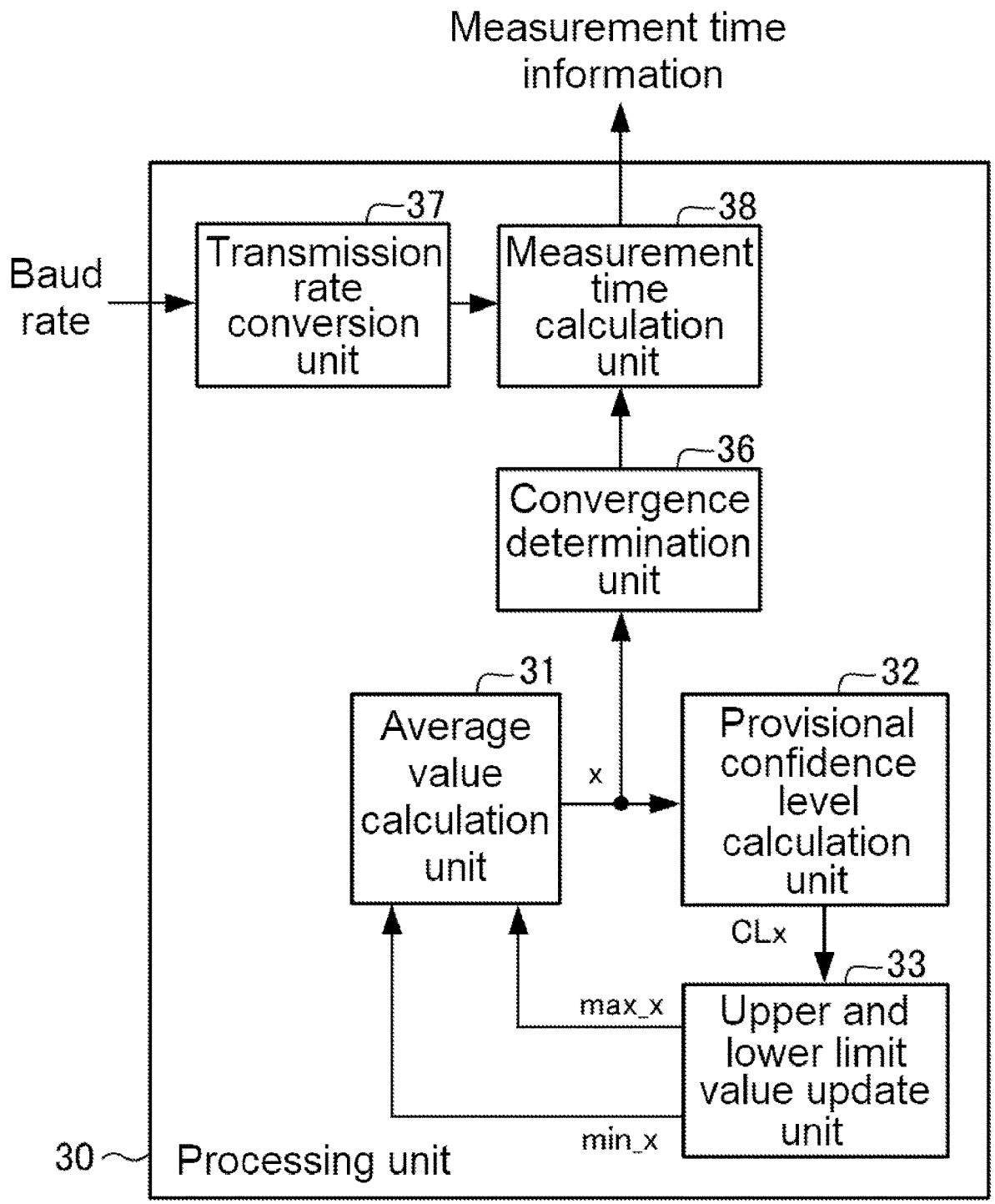
FIG. 2 is a block diagram illustrating a configuration of a processing unit provided in the error rate measurement apparatus according to the embodiment of the present invention.

As illustrated in FIG. 2, the processing unit 30 includes an average value calculation unit 31, a provisional confidence level calculation unit 32, an upper and lower limit value update unit 33, a convergence determination unit 36, a transmission rate conversion unit 37, and a measurement time calculation unit 38.

The average value calculation unit 31 is configured to calculate a sum x of a value obtained by dividing a variable min_x by 2 and a value obtained by dividing a variable max_x by 2.

The provisional confidence level CLx obtained in a case where an initial value of the variable min_x is substituted for x in the following expression (2) needs to be lower than the target confidence level $CL_s$. Similarly, the provisional confidence level CLx obtained in a case where an initial value of the variable max_x is substituted for x in the following expression (2) needs to be higher than the target confidence level $CL_s$.

Therefore, for example, it is preferable that the initial value of the variable min_x is 0 and the initial value of the variable max_x is a maximum significant value of the numerical type used in the calculation.

The average value calculation unit 31 performs rounding processing of rounding down the numerical value of the lower digit of each value such that each value of min_x/2, max_x/2, and x is within the maximum number of significant digits of the numerical type in use. That is, all of min_x/2, max_x/2, and x calculated by the average value calculation unit 31 include a rounding error. The rounding processing is not limited to the rounding down, and may be any rounding processing such as rounding up.

The numerical types of the variable min_x, the variable max_x, and the sum x are, for example, any one of a single-precision floating-point number (float type), a double-precision floating-point number (double type), or a fixed point number. Among these, the double type is 64-bit data consisting of a 1-bit significand, a 52-bit mantissa, and an 11-bit exponent. The maximum significant value of the double type is 1.79769313486232E+308 in decimal conversion.

The provisional confidence level calculation unit 32 is configured to substitute the sum x calculated by the average value calculation unit 31 into the following expression (2) to calculate the provisional confidence level CLx. As is clear from the expression (2), the provisional confidence level CLx monotonically increases with respect to the sum x.

$$CLx = e^{-x} \times \sum_{k=0}^{E} \frac{x^k}{k!} \quad (2)$$

In the expression (2),
x: $N \times ER_s$
N: data rate [data/s]×measurement time [s]
$ER_s$: target error rate (ER)
E: assumed number of errors.

That is, the expression (2) is obtained by substituting $N \times BER_s$ of the expression (1) with $N \times ER_s(=x)$.

The data rate is a parameter indicating the number of units of measurement included in the input signal from the DUT 200 per second. The unit of measurement is, for example, any of 1 bit (Bit), 1 symbol (PAM4 Symbol), 1 flow control unit (Flit), or 1 codeword (Codeword). Therefore, N is a parameter indicating the number of units of measurement included in the input signal from the DUT 200 over the measurement time, that is, the number of measurement data. The target error rate $ER_s$ is, for example, any one of the BER, the SER, the uncorrectable codeword rate, or the flit error rate, and is an upper limit value of the error rate of the input signal.

The upper and lower limit value update unit 33 is configured to substitute the latest sum x for the variable min_x in a case where the provisional confidence level CLx calculated by the provisional confidence level calculation unit 32 is equal to or lower than the target confidence level $CL_s$. On the other hand, the upper and lower limit value update unit 33 is configured to substitute the latest sum x for the variable max_x in a case where the provisional confidence level CLx calculated by the provisional confidence level calculation unit 32 is higher than the target confidence level $CL_s$.

Figure 3:
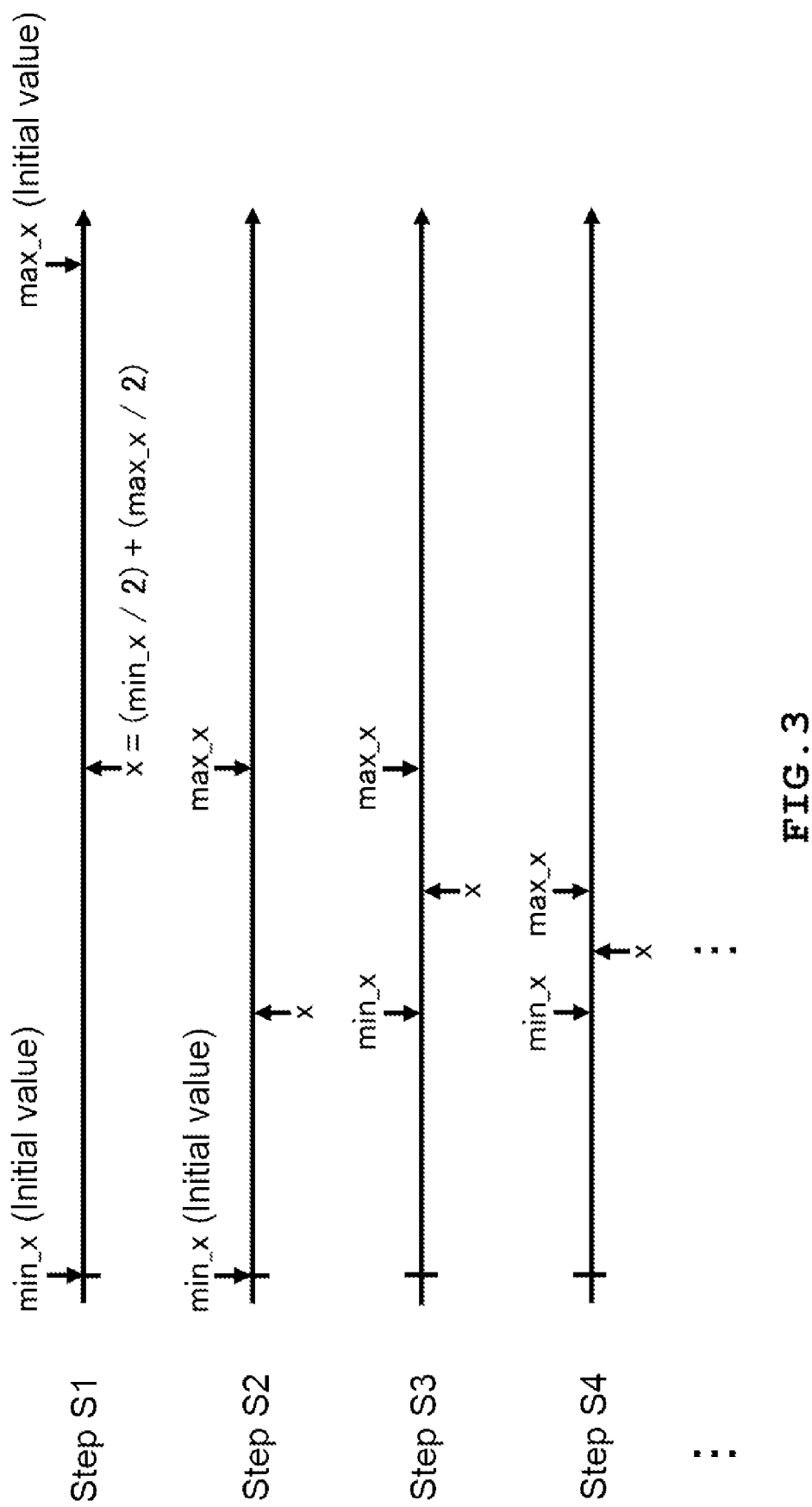
FIG. 3 is an explanatory diagram illustrating an operation of the processing unit provided in the error rate measurement apparatus according to the embodiment of the present invention.

Since the provisional confidence level CLx monotonically increases with respect to the sum x, an approximate value of the sum x can be obtained by narrowing down a range of the value of the sum x by repeating the processing of the average value calculation unit 31, the provisional confidence level calculation unit 32, and the upper and lower limit value update unit 33. FIG. 3 is a diagram illustrating the narrowing-down processing of the sum x by the average value calculation unit 31, the provisional confidence level calculation unit 32, and the upper and lower limit value update unit 33.

First, the average value calculation unit 31 calculates the sum x by using the initial value of the variable min_x and the initial value of the variable max_x (step S1).

Then, the provisional confidence level calculation unit 32 calculates the provisional confidence level CLx by substituting the sum x calculated in step S1 into the expression (2). The upper and lower limit value update unit 33 substitutes the latest sum x for the variable max_x in a case where the provisional confidence level CLx calculated by the provisional confidence level calculation unit 32 is higher than the target confidence level $CL_s$. The average value calculation unit 31 calculates the sum x again by using the initial value of the variable min_x and the updated variable max_x (step S2).

Then, the provisional confidence level calculation unit 32 calculates the provisional confidence level CLx by substituting the sum x calculated in step S2 into the expression (2). The upper and lower limit value update unit 33 substitutes the latest sum x for the variable min_x in a case where the provisional confidence level CLx calculated by the provisional confidence level calculation unit 32 is equal to or lower than the target confidence level $CL_s$. The average value calculation unit 31 calculates the sum x again by using the updated variable min_x and the variable max_x (step S3).

Then, the provisional confidence level calculation unit 32 calculates the provisional confidence level CLx by substituting the sum x calculated in step S3 into the expression (2). The upper and lower limit value update unit 33 substitutes the latest sum x for the variable max_x in a case where the provisional confidence level CLx calculated by the provisional confidence level calculation unit 32 is higher than the target confidence level $CL_s$. The average value calculation unit 31 calculates the sum x again by using the variable min_x and the updated variable max_x (step S4).

That is, the average value calculation unit 31 calculates the latest sum x by using the latest variable min_x and the latest variable max_x. Further, the provisional confidence level calculation unit 32 calculates the provisional confidence level CLx by substituting the latest sum x into the expression (2). Then, the upper and lower limit value update unit 33 substitutes the latest sum x for the variable min_x or the variable max_x in accordance with the latest provisional confidence level CLx. As described above, the processing unit 30 repeats the narrowing-down processing of the sum x by the average value calculation unit 31, the provisional confidence level calculation unit 32, and the upper and lower limit value update unit 33 by using the latest variable min_x and the latest variable max_x.

The convergence determination unit 36 is configured to determine whether or not the changes in the value of the sum x calculated by the average value calculation unit 31 are converged in a predetermined range. As an example, the convergence determination unit 36 may be configured to determine whether or not the significant figures of the sum x calculated by the average value calculation unit 31 are converged to a certain value. In a case where the numerical types of the variable min_x, the variable max_x, and the sum x are the double type, the significant figures of the variable min_x, the variable max_x, and the sum x are the mantissa the double type.

The convergence determination unit 36 determines that the significant figures of the sum x are converged to a certain value, for example, in a case where the latest sum x and the previous sum x are equal to each other. Alternatively, the convergence determination unit 36 may determine that the significant figures of the sum x are converged to a certain value in a case where the sum x calculated by the average value calculation unit 31 is equal over any number of times of three or more times.

Figure 5:
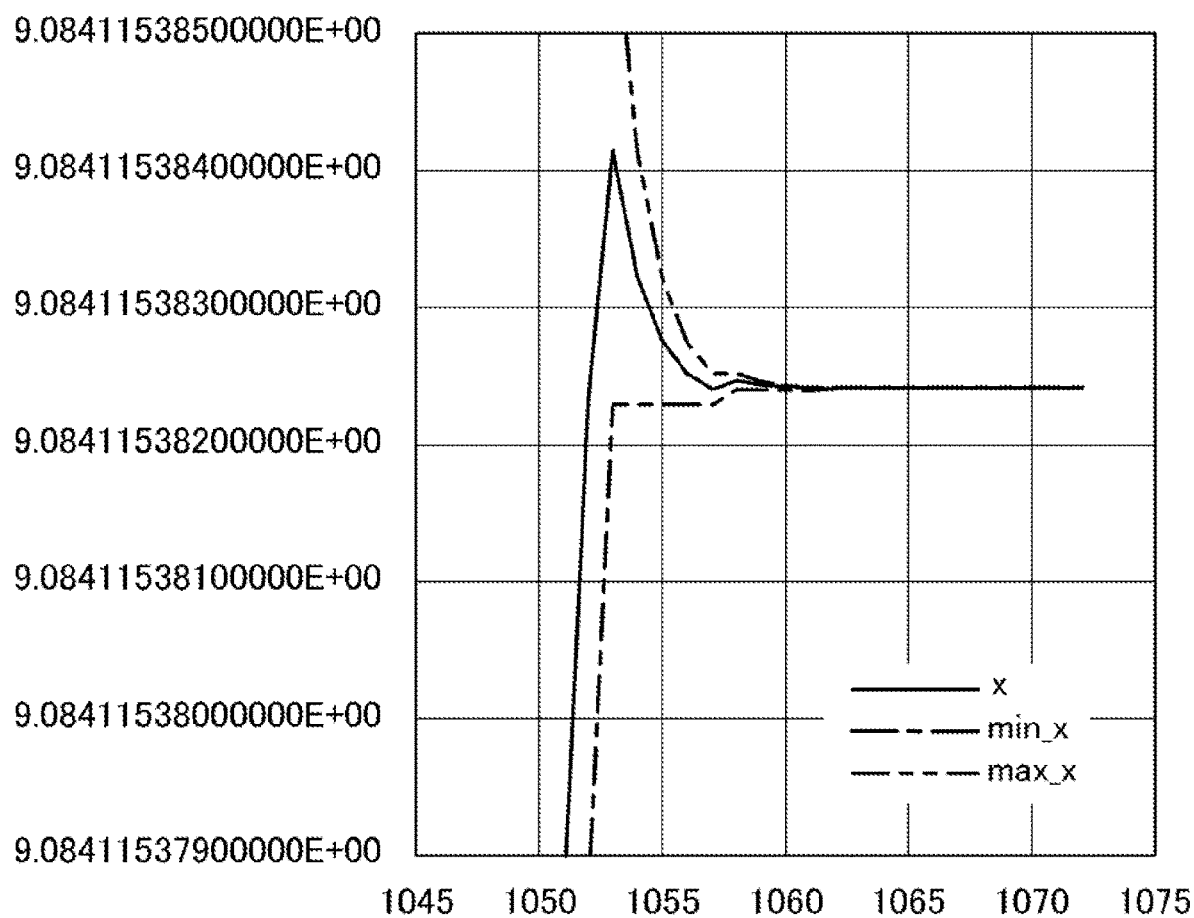
FIG. 5 is a graph illustrating the change in each value in a case where the numerical type is the double type.

FIG. 4 is a table illustrating the change in each value in a case where the numerical types of the variable min_x, the variable max_x, and the sum x are the double type. In addition, FIG. 5 is a graph illustrating data in the vicinity in which the sum x is converged in the changes in the variable min_x, the variable max_x, and the sum x illustrated in FIG. 4. Here, it is assumed that the input signal from the DUT 200 is the NRZ signal, the data rate is 2.4 Gbps, the target error rate $ER_s$ as a reference of the confidence level is 1E-14, the assumed number of errors E as a reference of the confidence level is 3, and the target confidence level $CL_s$ is 0.98.

In the example of FIG. 4, it can be seen that the value of min_x is changed in the 1071st and 1072nd calculation results, but the value of x is not changed. This result indicates that the values of x are converged due to the rounding error.

In the 1069th to 1072nd calculation results, the $CL_s$ and the CLx match, but x may be converged before the $CL_s$ and the CLx match depending on the input value to the expression (2). Therefore, it is not desirable to use whether or not $CL_s$ and CLx match as an end determination condition of the narrowing-down processing of the sum x.

In a case where, for example, the double type is used as the numerical types of the variable min_x, the variable max_x, and the sum x, a result having the significant figures of approximately 14 digits can be obtained in decimal conversion. The number of repetitions of the narrowing-down processing of the sum x is approximately 1000 times, and the time required for the 1000 repetitions is approximately several tens of ms. Therefore, it is considered that the narrowing-down processing of the sum x does not impair the convenience of the user.

In addition, in this narrowing-down processing, the convergence of the sum x due to the rounding error is used as the end determination condition of the processing, instead of the number of repetitions of the processing. Therefore, the user does not need to consider a range of available values as the sum x or the number of repetitions of the processing each time various measurement conditions are changed on the setting screen 50.

Alternatively, the convergence determination unit 36 may be configured to determine whether or not the change in the value of the sum x calculated by the average value calculation unit 31 is equal to or lower than a predetermined value of the number of digits lower than a maximum number of significant digits of the used numerical type, instead of waiting for the convergence of the sum x due to the rounding error. In this case, the number of significant digits is decreased, but the speed of the narrowing-down processing can be further increased.

The transmission rate conversion unit 37 is configured to convert the baud rate, which is input to the setting screen 50 described below, into a transmission rate (data rate) in accordance with the unit of measurement.

As illustrated in the following expression (3), the measurement time calculation unit 38 is configured to calculate a value obtained by dividing the sum x calculated by the average value calculation unit 31 and determined to be converged by the convergence determination unit 36 by a product of the data rate converted by the transmission rate conversion unit 37 and the target error rate $ER_s$, as the measurement time.

$$\text{Measurement time } [s] = x/(\text{data rate } [\text{data}/s] \times ER_s) \quad (3)$$

The operation unit 41 is configured to receive an operation input from the user, and is configured with a user interface such as an operation knob, various keys, switches, buttons, and soft keys on a display screen of the display unit 42 provided in the error rate measurement apparatus 1 illustrated in FIG. 1. In addition, the operation unit 41 performs various settings related to the error rate measurement of the error rate measurement apparatus 1 and settings of various measurement conditions on the setting screen 50.

The display unit 42 is configured with, for example, a display device such as a liquid crystal display (LCD) or a cathode ray tube (CRT) provided in the error rate measurement apparatus 1 illustrated in FIG. 1, and displays the setting screen 50, the measurement result, or the like based on a display control signal from the control unit 43. The display unit 42 may have an operation function of the operation unit 41, such as the soft key, on the display screen.

The control unit 43 integrally controls the signal output unit 10, the signal input unit 20, the data storage unit 40, the operation unit 41, and the display unit 42. The control unit 43 is configured with a control device such as a computer including a central processing unit (CPU), a graphics processing unit (GPU), a field programmable gate array (FPGA), a read only memory (ROM), a random access memory (RAM), and a hard disk drive (HDD). The control unit 43 can also configure at least a part of the error rate measurement unit 22 by software by executing a predetermined program by the CPU or the GPU.

Figure 6:
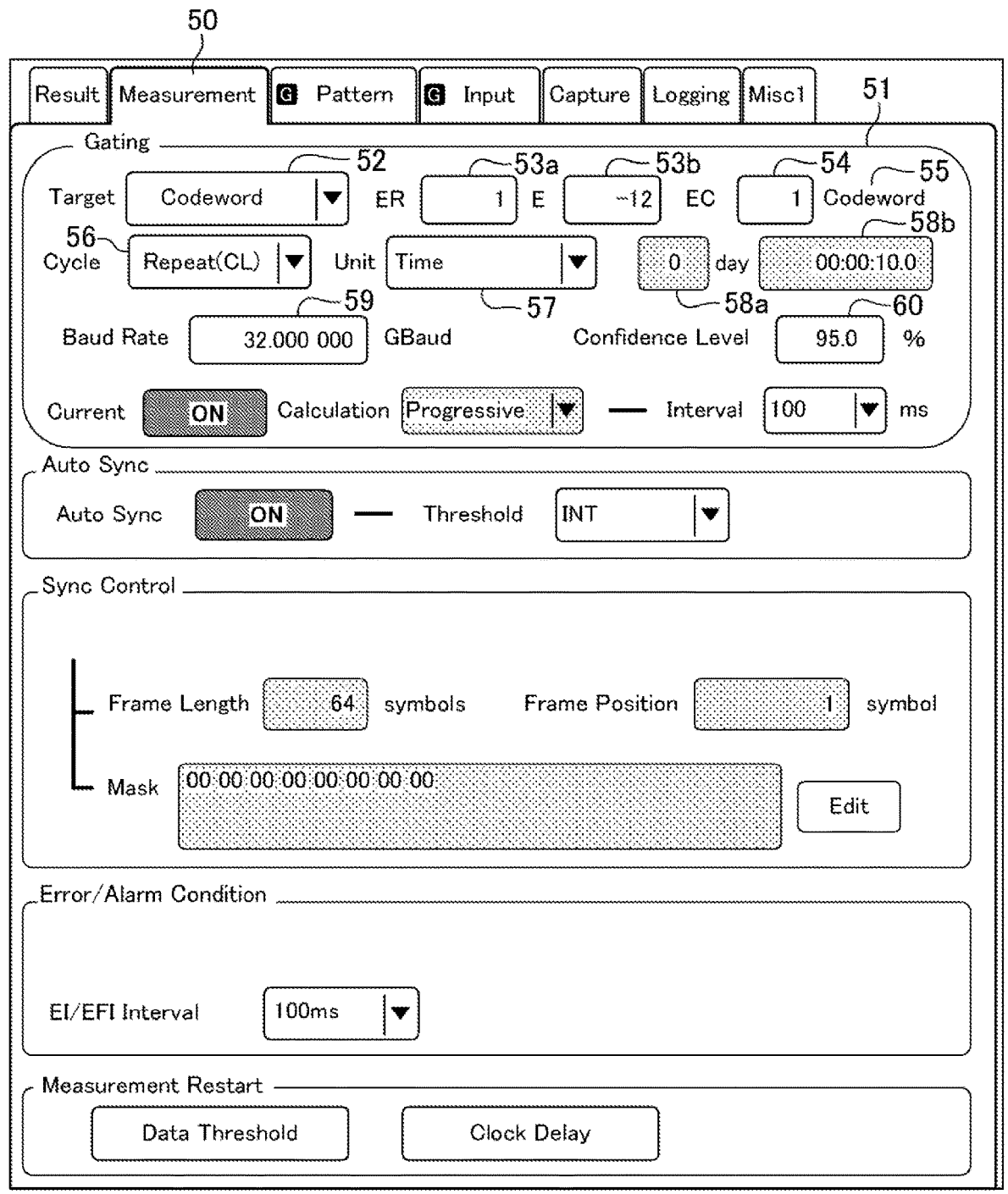
FIG. 6 is an example of a setting screen of the error rate measurement apparatus according to the embodiment of the present invention.

As illustrated in FIG. 6, the display unit 42 displays the setting screen 50 for setting the measurement condition of the error rate of the input signal from the DUT 200.

The setting screen 50 includes, in a display area 51 (in the drawing, "Gating"), a pull-down menu 52 of "Target", text boxes 53a and 53b of "ER", a text box 54 of "EC", a text 55 indicating a unit of the assumed number of errors E, a pull-down menu 56 of "Cycle", a pull-down menu 57 of "Unit", text boxes 58a and 58b of the measurement time, a text box 59 of "Baud Rate", and a text box 60 of "Confidence Level".

The pull-down menu 52 of "Target" constitutes a unit-of-measurement input portion for inputting the unit of measurement of the error rate. In the pull-down menu 52 of "Target", for example, any one unit of measurement of "Bit", "PAM4 Symbol", "Flit", or "Codeword" can be selected. The unit-of-measurement input portion and a baud rate input portion, which will be described below, constitute a transmission rate input portion for inputting the transmission rate of the input signal from the DUT 200.

FIG. 7 is a table illustrating the unit of measurement that can be selected by the pull-down menu 52 of "Target" and the data rate of each unit of measurement converted by the transmission rate conversion unit 37.

"Bit" is a unit of measurement selected in a case where the BER of the input signal from the DUT 200 is to be measured. In a case where the input signal from the DUT 200 is the NRZ signal, the transmission rate conversion unit 37 outputs the baud rate, which is input to the text box 59 of "Baud Rate" described below, as the data rate as it is. In a case where the input signal from the DUT 200 is the PAM4 signal, the transmission rate conversion unit 37 outputs a rate obtained by doubling the baud rate input to the text box 59 of "Baud Rate", as the data rate.

"PAM4 Symbol" is a unit of measurement selected in a case where the SER of the input signal from the DUT 200 is to be measured. In a case where the input signal from the DUT 200 is the PAM4 signal, the transmission rate conversion unit 37 outputs the baud rate input to the text box 59 of "Baud Rate" as the data rate as it is.

"Flit" is a unit of measurement selected in a case where the flit error rate of the input signal from the DUT 200 is to be measured. The transmission rate conversion unit 37 outputs a rate obtained by doubling the baud rate input to the text box 59 of "Baud Rate" and dividing the doubled baud rate by the Flit length as the data rate. Here, the Flit length is 2048 bits.

"Codeword" is a unit of measurement selected in a case where the uncorrectable codeword rate of the input signal from the DUT 200 is to be measured. The transmission rate conversion unit 37 outputs a rate obtained by doubling the baud rate input to the text box 59 of "Baud Rate" and dividing the doubled baud rate by a Codeword (CW) length, as the data rate. Here, in a case of Reed-Solomon forward error correction (RS-FEC) (544, 514) defined in IEEE 802.3, the CW length is 5440 bits.

The text boxes 53a and 53b of "ER" constitute a target error rate input portion for inputting a desired target error rate $ER_s$ of the input signal from the DUT 200. The target error rate $ER_s$ can be input to the text boxes 53a and 53b in exponential notation, the mantissa is input to the text box 53a, and the exponent is input to the text box 53b. For example, a value in a range of 1E-3 to 1E-15 can be input to the text boxes 53a and 53b.

The text box 54 of "EC" constitutes an assumed-number-of-errors input portion for inputting the assumed number of errors E during the measurement time of the input signal from the DUT 200. For example, a value in a range of 0 to 10 can be input to the text box 54. In addition, the display of the text 55 indicating the unit of the assumed number of errors E input to the text box 54 is changed in accordance with the unit of measurement selected in the pull-down menu 52 of "Target".

For example, in a case where "Bit" is selected in the pull-down menu 52 of "Target", the text 55 is displayed as "Bit". In a case where "PAM4 Symbol" is selected in the pull-down menu 52 of "Target", the text 55 is displayed as "Symbol". In a case where "Flit" is selected in the pull-down menu 52 of "Target", the text 55 is displayed as "Flit". In a case where "Codeword" is selected in the pull-down menu 52 of "Target", the text 55 is displayed as "Codeword".

In the pull-down menu 56 of "Cycle", for example, any one measurement operation of "Repeat (CL)", "Single(CL)", "Repeat", "Single", or "Untimed" can be selected.

"Repeat(CL)" is a measurement operation of repeating the measurement of the error rate of the measurement time calculated by the measurement time calculation unit 38. "Single (CL)" is a measurement operation of measuring the error rate of the measurement time calculated by the measurement time calculation unit 38 once. "Repeat" is a measurement operation of repeating the error rate measurement of the measurement time in accordance with a measurement period selected in the pull-down menu 57 of "Unit" described below. "Single" is a measurement operation of measuring the error rate of the measurement time in accordance with the measurement period selected by the pull-down menu 57 of "Unit" once. "Untimed" is a measurement operation of continuously measuring the error rate from a measurement start instruction by pressing a measurement start button (not illustrated) to a measurement end instruction by pressing a measurement stop button (not illustrated).

In the pull-down menu 57 of "Unit", for example, a unit of any one measurement period of "Time", "Clock Count", or "Error count" can be selected. In a case where "Repeat (CL)" or "Single(CL)" is selected in the pull-down menu 56 of "Cycle", the pull-down menu 57 of "Unit" is fixed to "Time".

"Time" is an item for inputting or displaying the measurement time serving as a unit of the measurement period in the text boxes 58a and 58b of the measurement time. In a case where "Repeat" or "Single" is selected in the pull-down menu 56 of "Cycle", the measurement time per measurement period can be input to the text boxes 58a and 58b of the measurement time in a range of, for example, 1 second to 99 days 23 hours 59 minutes 59 seconds in units of 1 second. The number of days in a range of, for example, 0 days to 99 days can be input to the text box 58a. A time in a range of, for example, 1 second to 23 hours 59 minutes 59.9 seconds can be input to the text box 58b.

In a case where "Repeat(CL)", "Single(CL)", or "Untimed" is selected in the pull-down menu 56 of "Cycle", the text boxes 58a and 58b of the measurement time are in a state in which the value cannot be input.

In a case where "Repeat(CL)" or "Single(CL)" is selected in the pull-down menu 56 of "Cycle", the text boxes 58a and 58b of the measurement time constitute a measurement time display portion for displaying the measurement time calculated by the measurement time calculation unit 38. The text box 58a can display the number of days in a range of, for example, 0 days to 99 days. The text box 58b can display, for example, a time in a range of 1 second to 23 hours 59 minutes 59.9 seconds.

In a case where any one of the selection content of the pull-down menu 52 of "Target", the input contents of the text boxes 53a and 53b of "ER", the input content of the text box 54 of "EC", the input content of the text box 59 of "Baud Rate", or the input content of the text box 60 of "Confidence Level" is changed, the display of the calculation result of the measurement time in the text boxes 58a and 58b of the measurement time is also automatically updated.

Here, in the text box 58*b*, for example, a value obtained by rounding up the number of seconds in the measurement time calculated by the measurement time calculation unit 38 to the first or second decimal place is displayed. In the example of FIG. 4, the 1071st and 1072nd values of the sum x are 9.08411538241318E+00, and the measurement time calculated from the expression (3) in this case is 3.78504807600549E+05 [s]. In this case, the number of days of "4" is displayed in the text box 58*a*, and the time of "09:08:24.9" (rounded up to the second decimal place) or "09:08:25" (rounded up to the first decimal place) is displayed in the text box 58*b*.

"Clock Count" is an item for enabling a unit of the measurement period to be set by the clock count number in the text boxes 58*a* and 58*b* of the measurement time in a case where "Repeat" or "Single" is selected in the pull-down menu 56 of "Cycle". That is, the error rate measurement ends in a case where the time equal to or longer than the clock count number set in the text boxes 58*a* and 58*b* for the measurement time has elapsed.

"Error Count" is an item for enabling a unit of the measurement period to be set by the number of errors detected by the error rate measurement unit 22 in the text boxes 58*a* and 58*b* of the measurement time in a case where "Repeat" or "Single" is selected in the pull-down menu 56 of "Cycle". That is, the error rate measurement ends in a case where the error as many as the number of errors set in the text boxes 58*a* and 58*b* of the measurement time is detected by the error rate measurement unit 22.

The text box 59 of "Baud Rate" constitutes a baud rate input portion for inputting the transmission rate of the input signal from the DUT 200 by the baud rate. "Baud Rate" is an item for enabling the transmission rate of the input signal from the DUT 200 to be input in a range of, for example, 2.4 Gbaud to 64.2 Gbaud in a step of 1 kbaud.

The text box 60 of "Confidence Level" constitutes a target confidence level input portion for inputting the desired target confidence level $CL_s$ in a case where "Repeat(CL)" or "Single(CL)" is selected in the pull-down menu 56 of "Cycle". The target confidence level $CL_s$ is 0% in a case where the measurement time is 0 seconds or in a case where E is infinite in the expression (2), which is not realistic. The target confidence level $CL_s$ is 100% in a case where the measurement time is infinite, which is also not realistic. Therefore, a value of 0% and 100% cannot be set in the text box 60.

For example, the display unit 42 is configured to automatically switch the input value into the text box 60 to 0.1% in a case where 0% is input to the text box 60. In addition, the display unit 42 automatically switches the input value to 99.9% in the text box 60 in a case where 100% is input to the text box 60. Alternatively, the display unit 42 may display an error dialog to prompt the user to input the target confidence level $CL_s$ in the range of 0.1% to 99.9% in a case where 0% or 100% is input to the text box 60.

In a case where "Repeat" or "Single" is selected in the pull-down menu 56 of "Cycle", the text box 60 of "Confidence Level" can display a value obtained by rounding off the confidence level CL calculated from the following expression (4) by the processing unit 30 to the second decimal place in a range of 0% to 100% in steps of 0.1%. In a case where "Repeat" or "Single" is selected in the pull-down menu 56 of "Cycle", the text box 60 of "Confidence Level" is in a state in which the value cannot be input.

$$CL = e^{-N \times ER_S} \times \sum_{k=0}^{E} \frac{(\text{Data rate} \times \text{Measurement time} \times ER_S)^k}{k!} \quad (4)$$

In a case where "Untimed" is selected in the pull-down menu 56 of "Cycle", the display related to "Confidence Level" is erased from the setting screen 50. In addition, even in a case where the selection other than "Time" is made in the pull-down menu 57 of "Unit", the display related to "Confidence Level" is erased from the setting screen 50.

Figure 8:
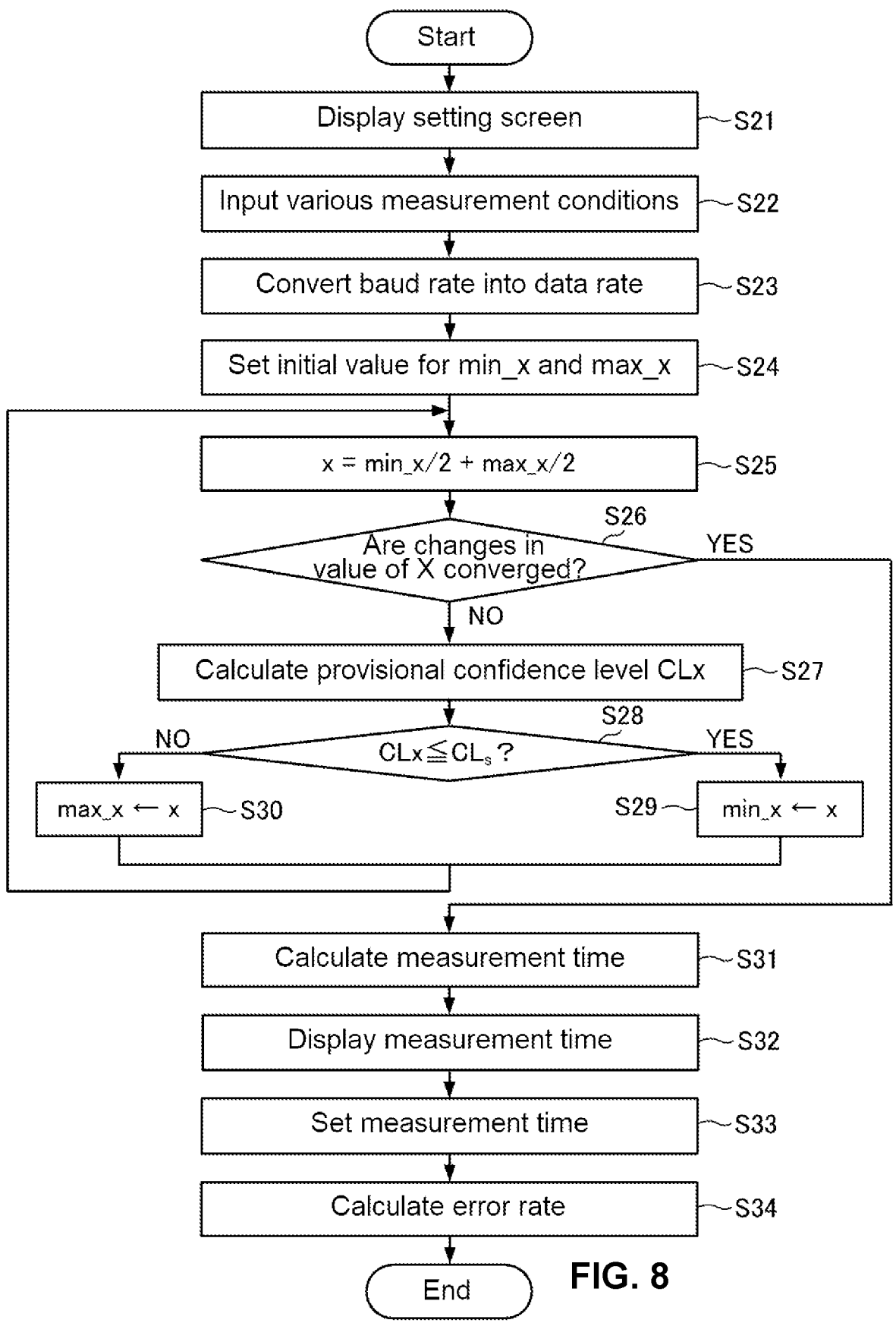
FIG. 8 is a flowchart illustrating processing of an error rate measurement method using the error rate measurement apparatus according to the embodiment of the present invention.
Figure 9:
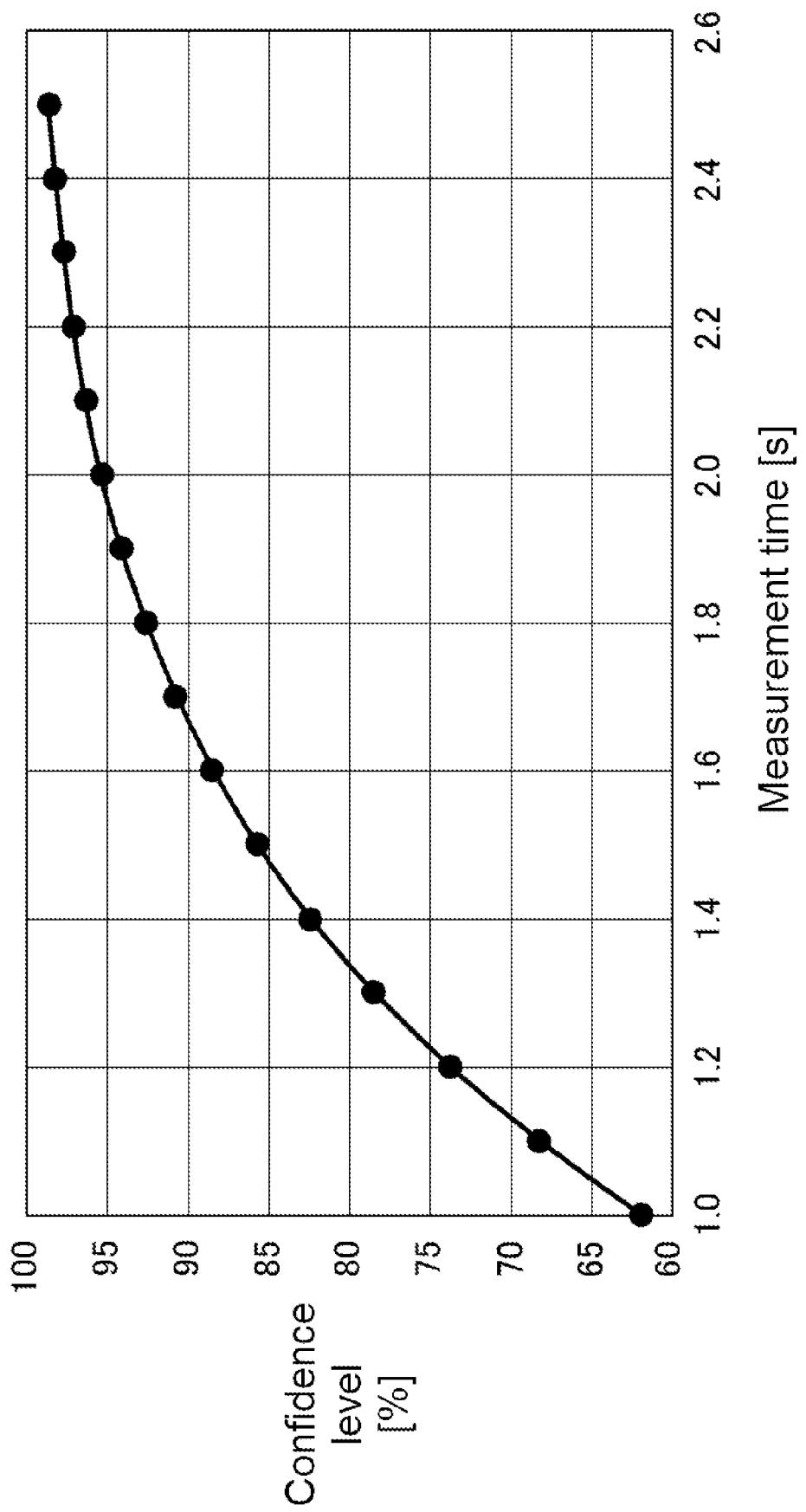
FIG. 9 is a graph illustrating an example of a confidence level with respect to a measurement time.

Hereinafter, an example of processing of the error rate measurement method using the error rate measurement apparatus 1 according to the present embodiment will be described with reference to the flowchart of FIG. 8. The description overlapping the description of the configuration of the error rate measurement apparatus 1 will be appropriately omitted. Here, the processing in a case where "Repeat (CL)" or "Single (CL)" is selected in the pull-down menu 56 of "Cycle" will be described.

First, the control unit 43 displays the setting screen 50 for setting the measurement condition of the error rate of the input signal from the DUT 200 on the display unit 42 (setting screen display step S21).

Then, the user inputs the measurement conditions, such as the target confidence level $CL_s$, the unit of measurement of the error rate, the baud rate of the input signal (data rate information), the target error rate $ER_s$ of the input signal, and the assumed number of errors E during the measurement time of the input signal, to the setting screen 50 via the operation unit 41 (input step S22).

Then, the transmission rate conversion unit 37 converts the baud rate input the text box 59 of "Baud Rate" into the transmission rate (data rate) in accordance with the unit of measurement selected by the pull-down menu 52 of "Target" (transmission rate conversion step S23).

Then, the upper and lower limit value update unit 33 sets 0 as the initial value for the variable min_x and sets the maximum significant value of the numerical type (for example, the double type) used in the calculation as the initial value for the variable max_x (step S24).

Then, the average value calculation unit 31 calculates the sum x of a value obtained by dividing the latest variable min_x by 2 and a value obtained by dividing the latest variable max_x by 2 (average value calculation step S25). This sum x includes the rounding error.

Then, the convergence determination unit 36 determines whether or not the changes in the value of the sum x calculated in the average value calculation step S25 are converged in a predetermined range (step S26). For example, in step S26, the convergence determination unit 36 determines whether or not the significant figures of the sum x are converged to a certain value.

In a case where the changes in the value of the sum x are converged in the predetermined range (step S26: YES), the processing unit 30 executes the processing in and after step S31. In a case where the changes in the value of the sum x are not converged in the predetermined range (step S26: NO), the processing unit 30 executes the processing in and after step S27.

That is, step S26 is a step of repeating the processing of the average value calculation step S25, and a provisional confidence level calculation step S27, a lower limit value update step S29, and an upper limit value update step S30, which will be described below, by using the latest variable min_x and the latest variable max_x.

In step S27, the provisional confidence level calculation unit 32 calculates the provisional confidence level CLx by substituting the sum x calculated in the average value calculation step S25 into the expression (2) (provisional confidence level calculation step S27).

Then, the processing unit 30 determines whether or not the provisional confidence level CLx calculated in the provisional confidence level calculation step S27 is equal to or lower than the target confidence level $CL_s$ (step S28).

In a case where the provisional confidence level CLx is equal to or lower than the target confidence level $CL_s$ (step S28: YES), the upper and lower limit value update unit 33 substitutes the latest sum x for the variable min_x (lower limit value update step S29) Then, the average value calculation unit 31 calculates the sum x again in step S25 by using the variable min_x updated in step S29.

In a case where the provisional confidence level CLx is higher than the target confidence level $CL_s$ (step S28: NO), the upper and lower limit value update unit 33 substitutes the latest sum x for the variable max_x (upper limit value update step S30). Then, the average value calculation unit 31 calculates the sum x again in step S25 by using the variable max_x updated in step S30.

In step S31, the measurement time calculation unit 38 calculates the measurement time satisfying the target confidence level $CL_s$ by substituting the sum x determined to be converged in step S26, the data rate converted in the transmission rate conversion step S23, and the target error rate $ER_s$ input in the input step S22 into the expression (3) (measurement time calculation step S31).

Then, the display unit 42 displays the measurement time calculated in the measurement time calculation step S31 in the text boxes 58a and 58b (measurement time display step S32).

Then, the processing unit 30 sets the measurement time information displayed in the measurement time display step S32 in the error rate calculation unit 25 (step S33).

Then, the error rate calculation unit 25 calculates the error rate of the input signal from the DUT 200 over the measurement time set by the processing unit 30 in step S33 (error rate calculation step S34).

As described above, in the error rate measurement of the input signal, the error rate measurement apparatus 1 according to the present embodiment can calculate the measurement time in which the desired target confidence level $CL_s$ can be obtained by performing narrowing-down processing of the sum x without making the user aware that calculation processing of the measurement time is performed.

In the error rate measurement apparatus 1 according to the present embodiment, since the convergence due to the rounding error is used as the end determination condition of the narrowing-down processing of the sum x, the user can save the time and effort of considering the range of available values as the sum x or the number of repetitions of the processing each time various measurement conditions are changed on the setting screen 50.

In a case where the numerical types of the variable min_x, the variable max_x, and the sum x are the double type, the error rate measurement apparatus 1 according to the present embodiment can calculate the measurement time by using the sum x having the significant figures of approximately 14 in decimal conversion.

In addition, the error rate measurement apparatus 1 according to the present embodiment can calculate the error rate of the input signal over the measurement time in which the desired target confidence level $CL_s$ is obtained.

DESCRIPTION OF REFERENCE NUMERALS AND SIGNS

1 Error rate measurement apparatus
25 Error rate calculation unit
30 Processing unit
31 Average value calculation unit
32 Provisional confidence level calculation unit
33 Upper and lower limit value update unit
36 Convergence determination unit
37 Transmission rate conversion unit
38 Measurement time calculation unit
41 Operation unit
42 Display unit
43 Control unit
50 Setting screen
52, 56, 57 Pull-down menu
53a, 53b, 54, 58a, 58b, 59, 60 Text box
55 Text
200 DUT

What is claimed is:

1. An error rate measurement apparatus that measures an error rate of an input signal from a device under test, the error rate measurement apparatus comprising:
a processing unit that calculates a measurement time satisfying a target confidence level based on the target confidence level, a data rate of the input signal, a target error rate of the input signal, and an assumed number of errors E during the measurement time of the input signal,
wherein the processing unit includes
an average value calculation unit that calculates a sum x of a value obtained by dividing a variable min_x by 2 and a value obtained by dividing a variable max_x by 2,
a provisional confidence level calculation unit of calculating a provisional confidence level CLx based on the sum x according to the expression:

$$CLx = e^{-x} \times \sum_{k=0}^{E} \frac{x^k}{k!},$$

an upper and lower limit value update unit that substitutes the sum x for the variable min_x in a case where the provisional confidence level CLx is equal to or lower than the target confidence level, and substitutes the sum x for the variable max_x in a case where the provisional confidence level CLx is higher than the target confidence level,
a convergence determination unit that determines whether or not changes in a value of the sum x calculated by the average value calculation unit are converged in a predetermined range, and
a measurement time calculation unit that calculates, in a case where the convergence determination unit determines the convergence, a value obtained by dividing the converged sum x by a product of the data rate and the target error rate, as the measurement time, and
the processing unit repeats processing of the average value calculation unit, the provisional confidence level calculation unit, and the upper and lower limit value update unit by using a latest variable min x and a latest variable max_x in a case where the convergence determination unit does not determine the convergence.

2. The error rate measurement apparatus according to claim 1,
wherein the sum x calculated by the average value calculation unit includes a rounding error, and
the measurement time calculation unit calculates, in a case where significant figures of the sum x are converged to a certain value, a value obtained by dividing the converged sum x by the product of the data rate and the target error rate, as the measurement time.

3. The error rate measurement apparatus according to claim 2,
wherein the sum x is data of a double-precision floating-point number, and
the significant figure is a mantissa of the double-precision floating-point number.

4. The error rate measurement apparatus according to claim 1, further comprising:
an error rate calculation unit that calculates the error rate of the input signal over the measurement time calculated by the measurement time calculation unit.

5. An error rate measurement method of measuring an error rate of an input signal from a device under test, the error rate measurement method comprising:
an input step of inputting a target confidence level, a data rate of the input signal, a target error rate of the input signal, and an assumed number of errors E during a measurement time of the input signal;
a step of setting initial values of a variable min x and a variable max_x;
an average value calculation step of calculating a sum x of a value obtained by dividing the variable min_x by 2 and a value obtained by dividing the variable max_x by 2;
a provisional confidence level calculation step of calculating a provisional confidence level CLx based on the sum x according to the expression:

$$CLx = e^{-x} \times \sum_{k=0}^{E} \frac{x^k}{k!};$$

a lower limit value update step of substituting the sum x for the variable min x in a case where the provisional confidence level CLx is equal to or lower than the target confidence level;
an upper limit value update step of substituting the sum x for the variable max x in a case where the provisional confidence level CLx is higher than the target confidence level;
a step of repeating processing of the average value calculation step, the provisional confidence level calculation step, the lower limit value update step, and the upper limit value update step by using a latest variable min x and a latest variable max_x; and
a measurement time calculation step of calculating, in a case where changes in a value of the sum x calculated in the average value calculation step are converged in a predetermined range, a value obtained by dividing the converged sum x by a product of the data rate and the target error rate, as the measurement time satisfying the target confidence level.

6. The error rate measurement method according to claim 5,
wherein the sum x calculated in the average value calculation step includes a rounding error, and
in the measurement time calculation step, in a case where significant figures of the sum x are converged to a certain value, a value obtained by dividing the converged sum x by the product of the data rate and the target error rate is calculated as the measurement time.

7. The error rate measurement method according to claim 6,
wherein the sum x is data of a double-precision floating-point number, and
the significant figure is a mantissa of the double-precision floating-point number.

8. The error rate measurement method according to claim 5, further comprising:
an error rate calculation step of calculating the error rate of the input signal over the measurement time calculated in the measurement time calculation step.

* * * * *